(12) United States Patent
Abiko et al.

(10) Patent No.: US 11,420,685 B2
(45) Date of Patent: Aug. 23, 2022

(54) VEHICLE BODY

(71) Applicant: Honda Motor Co., Ltd., Tokyo (JP)

(72) Inventors: Masahiro Abiko, Saitama (JP); Ryo Kita, Saitama (JP); Kei Watanabe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/189,213

(22) Filed: Mar. 1, 2021

(65) Prior Publication Data

US 2021/0269101 A1  Sep. 2, 2021

(30) Foreign Application Priority Data

Mar. 2, 2020 (JP) .............................. JP2020-034965

(51) Int. Cl.
*B62D 25/04* (2006.01)
*B62D 25/14* (2006.01)
*B62D 25/08* (2006.01)

(52) U.S. Cl.
CPC ........... *B62D 25/145* (2013.01); *B62D 25/04* (2013.01); *B62D 25/08* (2013.01)

(58) Field of Classification Search
CPC ....... B62D 25/04; B62D 25/145; B62D 25/08
USPC ............ 296/203.01, 203.02, 193.06, 187.09, 296/187.1
See application file for complete search history.

(56) References Cited

U.S. PATENT DOCUMENTS 9,764,765 B2  9/2017 Takeda et al.
9,764,772 B2  9/2017 Kondo et al.

| | | |
|---|---|---|
| 2013/0320710 A1 | 12/2013 | Watanabe |
| 2015/0035316 A1 | 2/2015 | Kuriyama et al. |
| 2016/0107695 A1 | 4/2016 | Lee et al. |
| 2017/0088073 A1 | 3/2017 | Takeda |
| 2017/0088180 A1 | 3/2017 | Takeda et al. |
| 2017/0096169 A1 | 4/2017 | Takeda |
| 2017/0217501 A1 | 8/2017 | Takeda |

FOREIGN PATENT DOCUMENTS

| | | |
|---|---|---|
| DE | 3925170 | * 10/1993 |
| JP | H10316030 | 12/1998 |
| JP | 3324493 | 9/2002 |
| JP | 2013032042 | 2/2013 |

(Continued)

OTHER PUBLICATIONS

"Office Action of Japan Counterpart Application" with English translation thereof, dated Sep. 29, 2021, p. 1-p. 4.

*Primary Examiner* — Dennis H Pedder
(74) *Attorney, Agent, or Firm* — JCIPRNET

(57) ABSTRACT

The disclosure provides a vehicle body capable of well preventing the deformation of a side door even if the weight of the vehicle itself increases. The vehicle body includes a front pillar upper which extends rearward and upward along a side edge of a windshield, a front pillar lower which is joined to a lower end of the front pillar upper to support a front end of the side door, a dash upper side which connects an upper member to the front pillar lower while being joined to the front pillar upper at a rear extension part, and a front pillar upper stiffener which reinforces the bending rigidity of the front pillar upper. A distance is set between the rear extension part of the dash upper side and a front end of the front pillar upper stiffener above the front pillar lower.

10 Claims, 8 Drawing Sheets

(56) References Cited

FOREIGN PATENT DOCUMENTS

| | | |
|---|---|---|
| JP | 2013248898 | 12/2013 |
| JP | 2014166768 | 9/2014 |
| JP | 2015113025 | 6/2015 |
| JP | 6226932 | 11/2017 |
| JP | 2019001383 | 1/2019 |
| WO | 2015122276 | 8/2015 |

* cited by examiner

VEHICLE BODY

CROSS-REFERENCE TO RELATED APPLICATION

This application claims the priority benefit of Japan application serial no. 2020-034965, filed on Mar. 2, 2020. The entirety of the above-mentioned patent application is hereby incorporated by reference herein and made a part of this specification.

BACKGROUND

Technical Field

The disclosure relates to a vehicle body including a front pillar upper which extends rearward and upward along a side edge of a windshield, a front pillar lower which is joined to a lower end of the front pillar upper to support a front end of a side door, and left and right upper members which extend while curving forward and downward from the front pillar lower.

Description of Related Art

Patent Document 1 (Japanese Patent No. 6226932) discloses a vehicle body including left and right upper members which extend while curving forward and downward from front pillars. A bumper beam which extends in the vehicle width direction is joined to the front ends of the upper members. At the time of a small overlap collision, the collision energy is absorbed according to the deformation of the upper members. The deformation of the side doors may be avoided (suppressed). However, in the vehicle body disclosed in Patent Document 1, when the weight of the vehicle itself increases, the collision energy may not be completely absorbed by the deformation of the upper members alone.

Patent Document 2 (Japanese Patent No. 3324493) discloses a vehicle body including a front pillar formed by an inner panel and an outer panel. The rear end of the upper member which extends while curving forward and downward is joined to the front pillar. In the joint area of the upper member, the rigidity of the front pillar is weakened based on the opening (hole). At the time of offset collision, the impact of the collision is transmitted from the upper member to the joint area. The collision energy is absorbed according to the deformation of the joint area. However, if the front pillar is easily deformed, the collision energy of the small overlap collision may not be absorbed based on the deformation of the upper member.

The disclosure provides a vehicle body capable of well preventing the deformation of a side door even if the weight of the vehicle itself increases.

SUMMARY

According to a first aspect of the disclosure, a vehicle body includes a front pillar upper which extends rearward and upward along a side edge of a windshield; a front pillar lower which is joined to a lower end of the front pillar upper to support a front end of a side door; a dash upper side which connects an upper member to the front pillar lower while being joined to the front pillar upper at a rear extension part; and a front pillar upper stiffener which reinforces the bending rigidity of the front pillar upper, and a distance is set between the rear extension part of the dash upper side and a front end of the front pillar upper stiffener above the front pillar lower.

DESCRIPTION OF THE EMBODIMENTS

Figure 1:
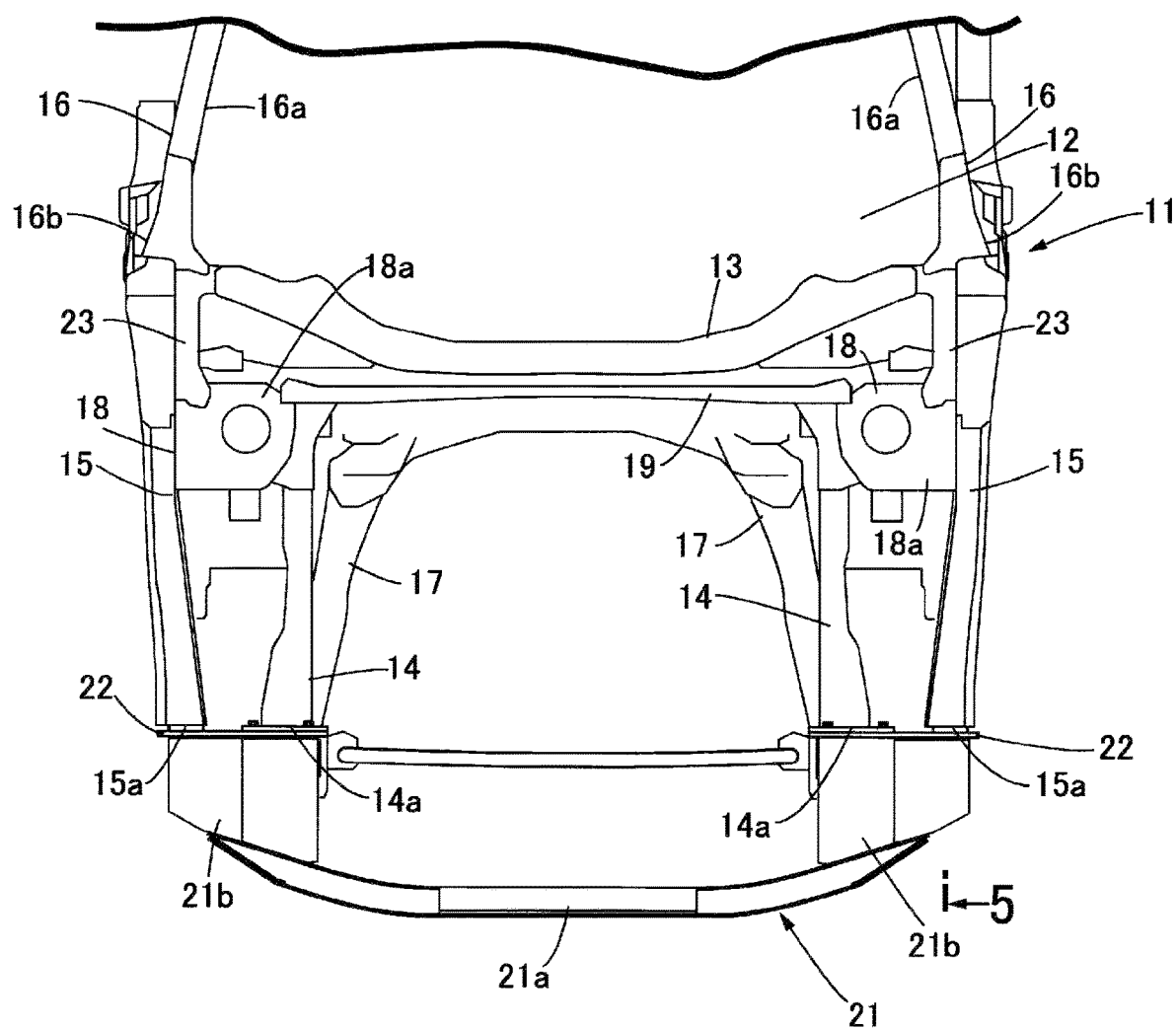
FIG. 1 is a plan view showing a front structure of a vehicle body according to an embodiment of the disclosure.

According to a first aspect of the disclosure, a vehicle body includes a front pillar upper which extends rearward and upward along a side edge of a windshield; a front pillar lower which is joined to a lower end of the front pillar upper to support a front end of a side door; a dash upper side which connects an upper member to the front pillar lower while being joined to the front pillar upper at a rear extension part; and a front pillar upper stiffener which reinforces the bending rigidity of the front pillar upper, and a distance is set between the rear extension part of the dash upper side and a front end of the front pillar upper stiffener above the front pillar lower.

According to a second aspect, in addition to the configuration of the first aspect, the vehicle body further includes a reinforcing structure which is formed on the front pillar lower from below the front end of the front pillar upper stiffener toward a rear side to reinforce the rigidity of the front pillar lower in a horizontal direction.

According to a third aspect, in addition to the configuration of the first or the second aspect, the front pillar upper stiffener has a bent shape having a ridge on an extension line of a ridge of the rear extension part.

According to a fourth aspect, in addition to the configuration of any one of the first to third aspects, the front pillar upper stiffener is fixed to an outward surface of the front pillar upper, and the rear extension part of the dash upper side is fixed to an inward surface of the front pillar upper.

According to a fifth aspect, in addition to the configuration of any one of the first to fourth aspects, the dash upper side includes a vertical wall which extends to a front side from the rear extension part; a horizontal wall which is bent inward in a vehicle width direction from an upper end of the vertical wall in front of the front pillar upper to increase the rigidity of the vertical wall in a front-rear direction of the vehicle body; and a widening piece which expands further inward in the vehicle width direction from the horizontal wall and is joined to a windshield support member that supports a lower edge of the windshield.

According to a sixth aspect, in addition to the configuration of any one of the first to fifth aspects, a front pillar lower inner panel and a front pillar outer panel which are components of the front pillar lower are stacked on the widening piece.

According to a seventh aspect, in addition to the configuration of the fifth aspect, a front end of the dash upper side is joined to a damper base.

According to an eighth aspect, in addition to the configuration of the seventh aspect, the dash upper side further includes a lower horizontal wall which is bent outward in the vehicle width direction from a lower end of the vertical wall to receive the upper member.

According to a ninth aspect, in addition to the configuration of the first aspect, the vehicle body further includes a front pillar outer panel which covers a front pillar lower inner panel and a front pillar upper inner panel from the outside; and a front pillar outer panel stiffener which is joined to an inner surface of the front pillar outer panel at a position facing an extension line of the front pillar upper stiffener and has a fragile zone at a position facing a vertical line that passes through a space forming the distance.

According to a tenth aspect, in addition to the configuration of the fifth aspect, the vehicle body further includes a reinforcing member which joins the windshield support member to a front pillar lower inner panel that is a component of the front pillar lower below the widening piece.

According to the first aspect, at the time of a small overlap collision, the impact of the collision is absorbed based on the deformation of the upper member. Since the distance is set between the rear extension part of the dash upper side and the front pillar upper stiffener, when the upper member is crushed, the deformation (bending) of the front pillar upper is facilitated at a cut of the dash upper side and the front pillar upper stiffener above the front pillar lower. In this way, the collision energy may be absorbed by sequentially deforming the upper member and the front pillar. Even if the weight of the vehicle itself increases, the deformation of the side door may be prevented.

According to the second aspect, the front pillar lower may be bent along a vertical line at the front end of the reinforcing structure. In this way, the bending deformation of the front pillar lower may be controlled.

According to the third aspect, since the ridge of the front pillar upper stiffener and the ridge of the dash upper side are disposed on a straight line, the load may be supported in the line direction. The deformation of the upper member may be ensured prior to the deformation of the front pillar.

According to the fourth aspect, since the reinforcing structures are switched inside and outside the front pillar upper, the deformation of the front pillar upper may be facilitated in the switching area.

According to the fifth aspect, since the rigidity of the dash upper side in the front-rear direction of the vehicle body is reinforced based on the formation of the ridge in front of the front pillar upper, the deformation (bending) of the front pillar upper may be facilitated at a cut of the dash upper side and the front pillar upper stiffener.

According to the sixth aspect, since the rigidity of the widening piece is further reinforced in front of the front pillar upper, the deformation (bending) of the front pillar upper may be further facilitated at the cut of the dash upper side and the front pillar upper stiffener.

According to the seventh aspect, the deformation of the upper member may be facilitated in front of the damper housing.

According to the eighth aspect, since the lower horizontal wall increases the rigidity of the vertical wall in the front-rear direction of the vehicle body based on the formation of the ridge, the deformation of the upper member may be facilitated in front of the damper base.

According to the ninth aspect, the rigidity of the front pillar outer panel is increased by the action of the front pillar outer panel stiffener, but the bending of the front pillar around the vertical line may be facilitated by the action of the fragile zone.

According to the tenth aspect, the rigidity of the widening piece may be reinforced. As a result, the deformation of the upper member may be facilitated in front of the widening piece. The collision energy may be well absorbed by the upper member.

Hereinafter, embodiments of the disclosure will be described with reference to the accompanying drawings. Here, the up, down, front, rear, left, and right of the vehicle body are defined based on the viewpoint of an occupant who is on the vehicle.

Figure 2:
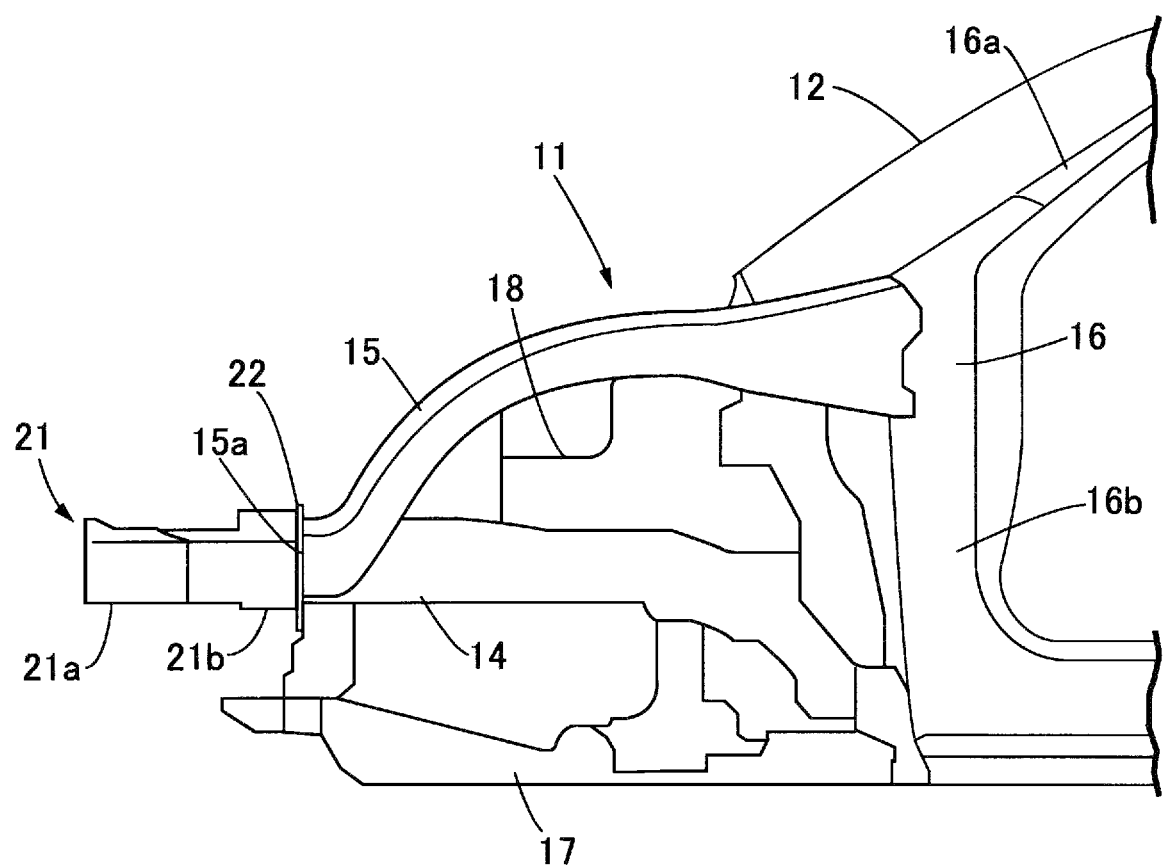
FIG. 2 is a left side view of the front structure of the vehicle body.

FIG. 1 schematically shows a vehicle body of a vehicle according to an embodiment of the disclosure. As shown in FIGS. 1 and 2, a vehicle body 11 includes a windshield support member 13 which is joined to the upper end of a dash panel (not shown) and supports the front edge of a windshield 12 from below, left and right front side frames 14 which extend from the front surface of the dash panel to the front of the vehicle body at positions separated from each other to the left and right in the vehicle width direction with a housing space of a power unit (for example, the engine room in this case) therebetween, left and right upper members 15 which are disposed side by side on the outside of the front side frames 14 and extend rearward and upward while bulging upward, and front pillars 16 which are joined to the rear ends of the upper members 15 to support the side edges of the windshield 12 and side doors. The dash panel expands to the left and right in the vehicle width direction in a vertical position and separates the vehicle interior from the engine room. The front end 15a of the upper member 15 is disposed outside the front side frame 14 in the vehicle width direction alongside the front end 14a of the front side frame 14. The front side frame 14, the upper member 15 and the front pillar 16 may be formed from a metal material such as aluminum alloy or stainless steel. The front side frame 14 and the upper member 15 may be formed by a tubular body having a square cross section.

The vehicle body 11 includes front subframes 17 which extend in the front-rear direction of the vehicle body below each of the front side frames 14. The front subframe 17 may be formed from a metal material such as aluminum alloy or stainless steel. The front subframe 17 is rigidly joined to the front side frame 14. For example, welding may be used for joining.

A suspension arm (not shown) is supported on each of the front subframes 17. Front wheels are rotatably supported around an axle on the suspension arm. Each of the front side frames 14 is supported by a damper housing 18 which stands up behind the suspension arm and houses a damper unit (not shown). The damper housing 18 includes a damper base 18a joined to the upper end of the damper unit. The lower end of the damper unit is connected to the suspension arm. The left and right damper bases 18a are connected to each other by a cross member 19 which extends in the vehicle width left-right direction.

A bumper beam assembly 21 is connected to the front ends 14a of the front side frames 14 and the front ends 15a of the upper members 15. The bumper beam assembly 21 includes a bumper beam 21*a* which extends in the vehicle width direction, crash cans (bumper beam extension) 21*b* which are joined to the left and right ends of the bumper beam 21*a* and receive a collision load input from the bumper beam 21*a*, and connecting plates 22 which connect the front ends 14*a* of the front side frames 14 and the front ends 15*a* of the upper members 15 to the crash cans 21*b*. The bumper beam 21*a*, the crash can 21*b* and the connecting plate 22 may be formed from a metal material such as aluminum alloy or stainless steel. The bumper beam 21*a* is rigidly joined to each of the crash cans 21*b*. For example, welding may be used for joining. The connecting plate 22 is rigidly joined to the crash can 21*b*. For example, welding may be used for joining.

The front pillar 16 includes a front pillar upper 16*a* which extends rearward and upward along the side edge of the windshield 12 and a front pillar lower 16*b* which is joined to the lower end of the front pillar upper 16*a* to support the front end of the side door. The front pillar 16 is joined with a dash upper side 23 which has high rigidity in the front-rear direction of the vehicle body and supports a load acting from the front of the vehicle body toward the front pillar 16. The dash upper side 23 connects the upper member 15 to the front pillar lower 16*b* while being joined to the lower end of the front pillar upper 16*a* at a rear extension part (to be described later). The front ends of the dash upper sides 23 are joined to the damper bases 18*a*. The rear ends of the dash upper sides 23 are joined to the front pillar lowers 16*b* and the left and right ends of the windshield support member 13.

Figure 3:
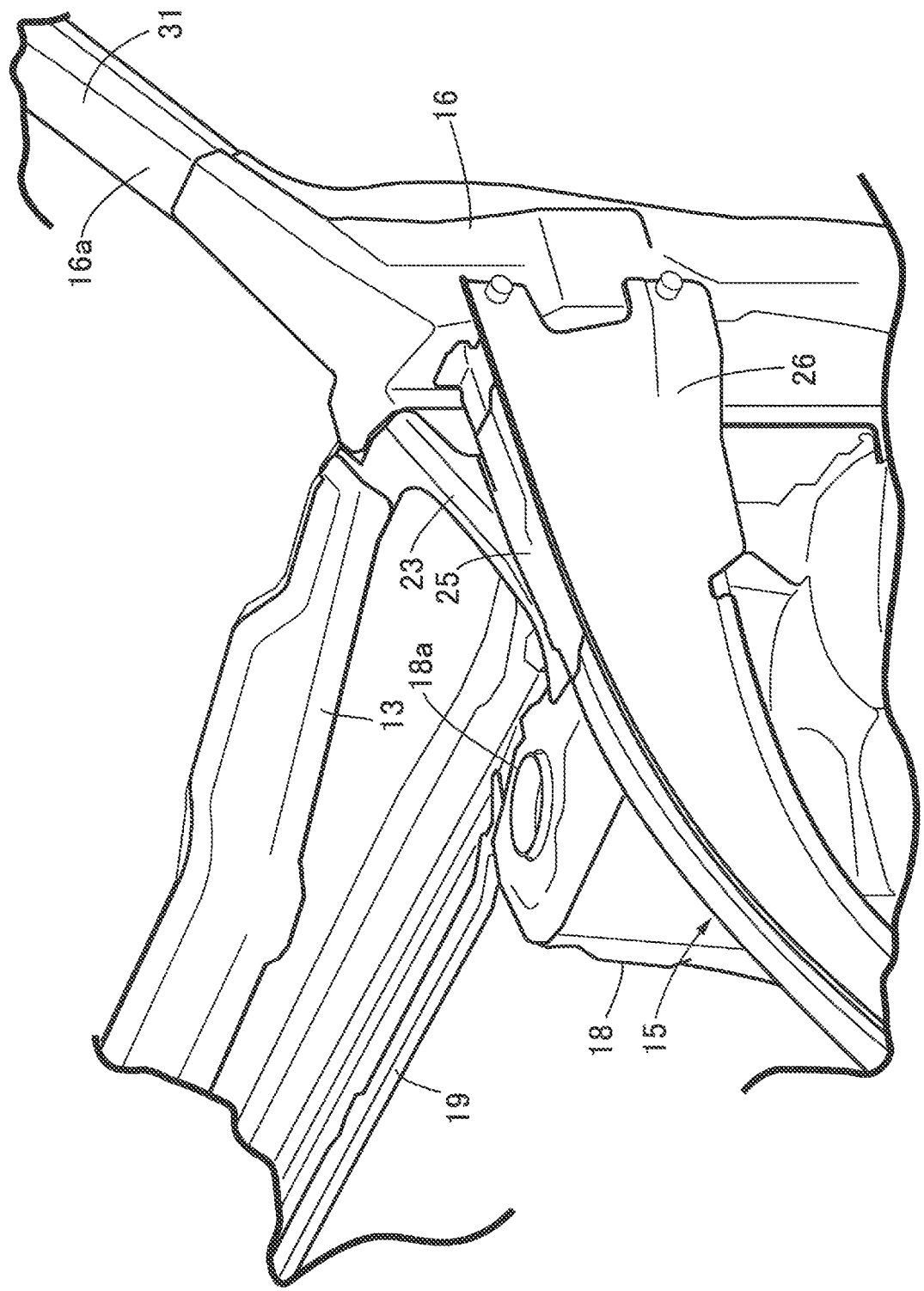
FIG. 3 is an enlarged perspective view schematically showing the structure of a front pillar and an upper member.

As shown in FIG. 3, the upper member 15 includes an upper member cover 26 which is joined to a square member 25 on the inner side and forms a tubular shape having a square cross section together with the square member 25. The upper member cover 26 may be molded from, for example, one plate material. A metal material such as aluminum alloy or stainless steel may be used for the upper member cover 26. The rear end of the upper member cover 26 is overlapped with the outer surface of the front pillar 16 and is joined to the front pillar 16.

Figure 4:
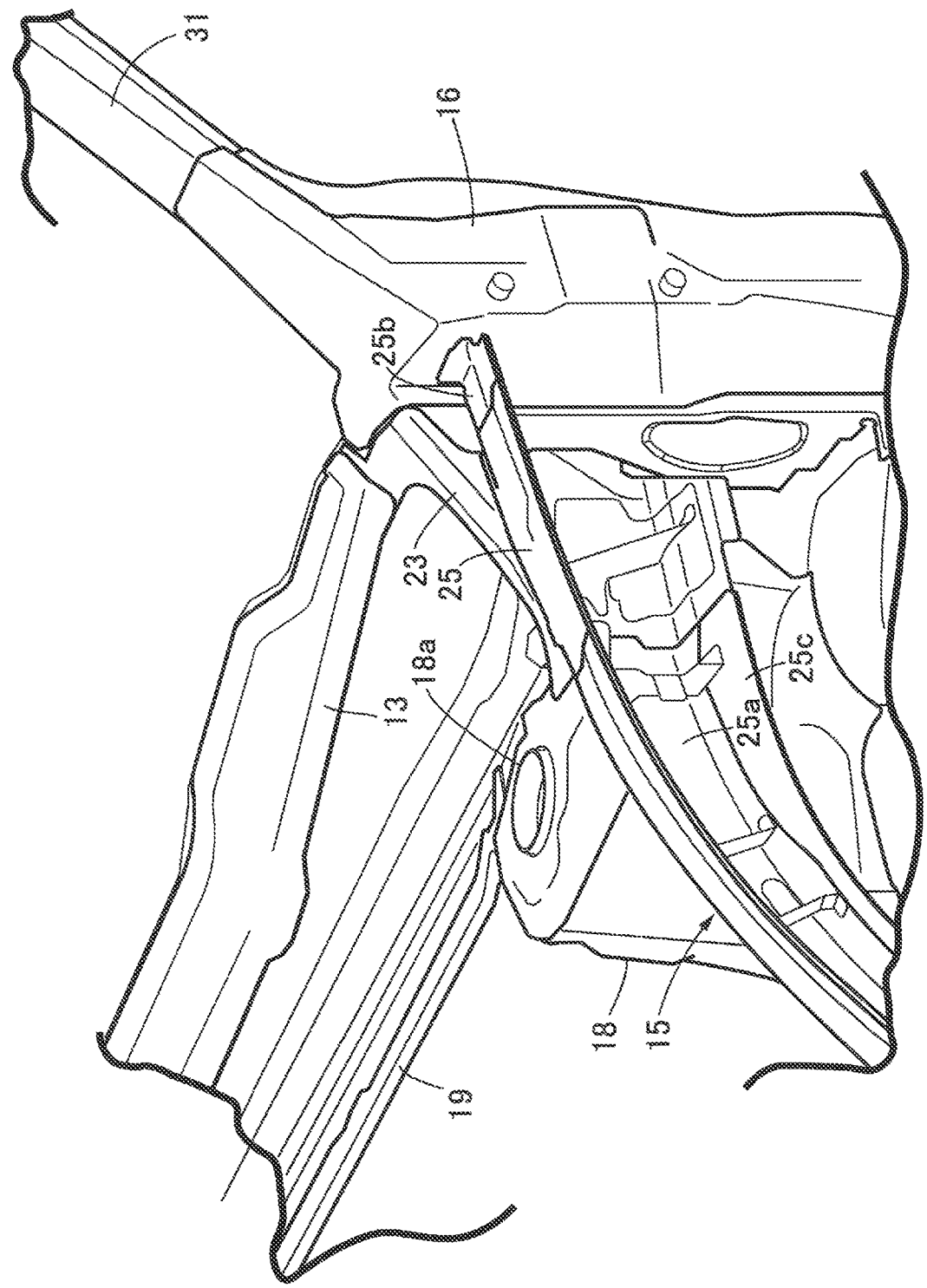
FIG. 4 is an enlarged perspective view schematically showing the structure of a square member of the upper member.

As shown in FIG. 4, the square member 25 has a vertical plate 25*a* which extends in the front-rear direction along a vertical plane, is connected to the damper housing 18 and is joined to the dash upper side 23 at the rear end; a top plate 25*b* which is formed by bending outward from the upper end of the vertical plate 25*a* in the vehicle width direction and is joined to the front pillar 16 at the rear end; and a bottom plate 25*c* which is formed by bending outward from the lower end of the vertical plate 25*a* in the vehicle width direction and is joined to the dash upper side 23 at the rear end. The upper member cover 26 is rigidly joined to the outward end of the top plate 25*b* and the outward end of the bottom plate 25*c* at the open end of the square member 25. The top plate 25*b* may be formed by multiple plate materials connected in the front-rear direction. For example, welding may be used for joining.

Figure 5:
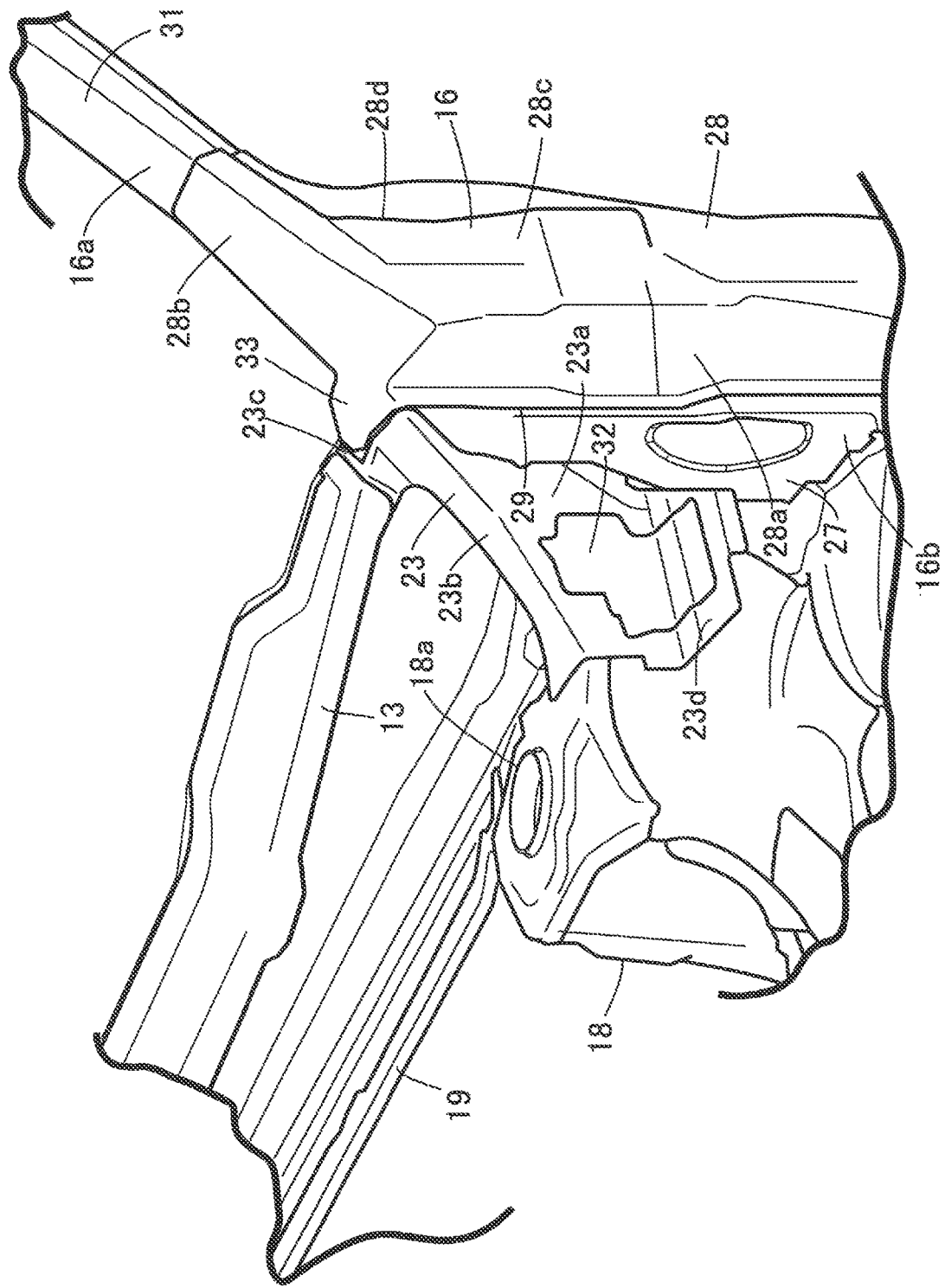
FIG. 5 is an enlarged perspective view schematically showing the structure of the front pillar and a dash upper side.

As shown in FIG. 5, the front pillar 16 includes a front pillar outer panel 28 which covers a front pillar lower inner panel 27 from the outside and forms the outer surface of the front pillar 16. The front pillar outer panel 28 has a front wall 28*a* which extends outward from a welding allowance 29 overlapped with the outer surface of the front pillar lower inner panel 27 and expands in the vertical direction; an upper wall 28*b* which extends rearward and upward from the upper end of the front wall 28*a* and partially covers the front end of a front pillar upper outer panel 31 of the front pillar upper 16*a*; an outer wall 28*c* which faces the outer surface of the front pillar lower inner panel 27 continuous from the front wall 28*a* and the upper wall 28*b*; and a rear wall 28*d* which expands from the rear end of the outer wall 28*c* toward the front pillar lower inner panel 27 to partition the housing space for the side door. The top plate 25*b* of the square member 25 is rigidly joined to the front wall 28*a* from the front. For example, welding may be used for joining. The upper member cover 26 is rigidly joined to the outer surface of the outer wall 28*c* from the outside. The front pillar lower inner panel 27 is joined to, for example, the left and right ends of the dash panel.

The dash upper side 23 has a vertical wall 23*a* which expands along the vertical plane and is overlapped with the inner surface of the front pillar lower inner panel 27, extends to the front side from the front pillar lower inner panel 27, and is joined to the damper housing 18 at the front end; a horizontal wall 23*b* which is bent inward in the vehicle width direction from the upper end of the vertical wall 23*a* in front of the front pillar upper 16*a* to form a ridge with the vertical wall 23*a* and is joined to the damper base 18*a* at the front end; a widening piece 23*c* which expands further inward in the vehicle width direction from the horizontal wall 23*b* at the rear end of the horizontal wall 23*b* and is joined to the windshield support member 13; and a lower horizontal wall 23*d* which is bent outward in the vehicle width direction from the lower end of the vertical wall 23*a* to form a ridge with the vertical wall 23*a* and receives the square member 25 of the upper member 15. Here, the rear end of the vertical plate 25*a* of the square member 25 is joined to the front end of the vertical wall 23*a*, and the rear end of the bottom plate 25*c* of the square member 25 is joined to the front end of the lower horizontal wall 23*d*. That is, the vertical wall 23*a* and the lower horizontal wall 23*d* form one component of the upper member 15. A continuous stiffener 32 is overlapped with both the vertical wall 23*a* and the lower horizontal wall 23*d*. The stiffener 32 is rigidly joined to, for example, the dash upper side 23. For example, welding may be used for joining. The rigidity of the vertical wall 23*a* in the front-rear direction of the vehicle body may be increased by the action of the ridge formed between the vertical wall 23*a* and the horizontal wall 23*b* and the ridge formed between the vertical wall 23*a* and the lower horizontal wall 23*d*.

A connecting piece 33 overlapped with the widening piece 23*c* of the dash upper side 23 is integrally connected to the upper wall 28*b* of the front pillar 16. The connecting piece 33 may be formed of a plate material continuous from the upper wall 28*b* and the welding allowance 29.

Figure 6:
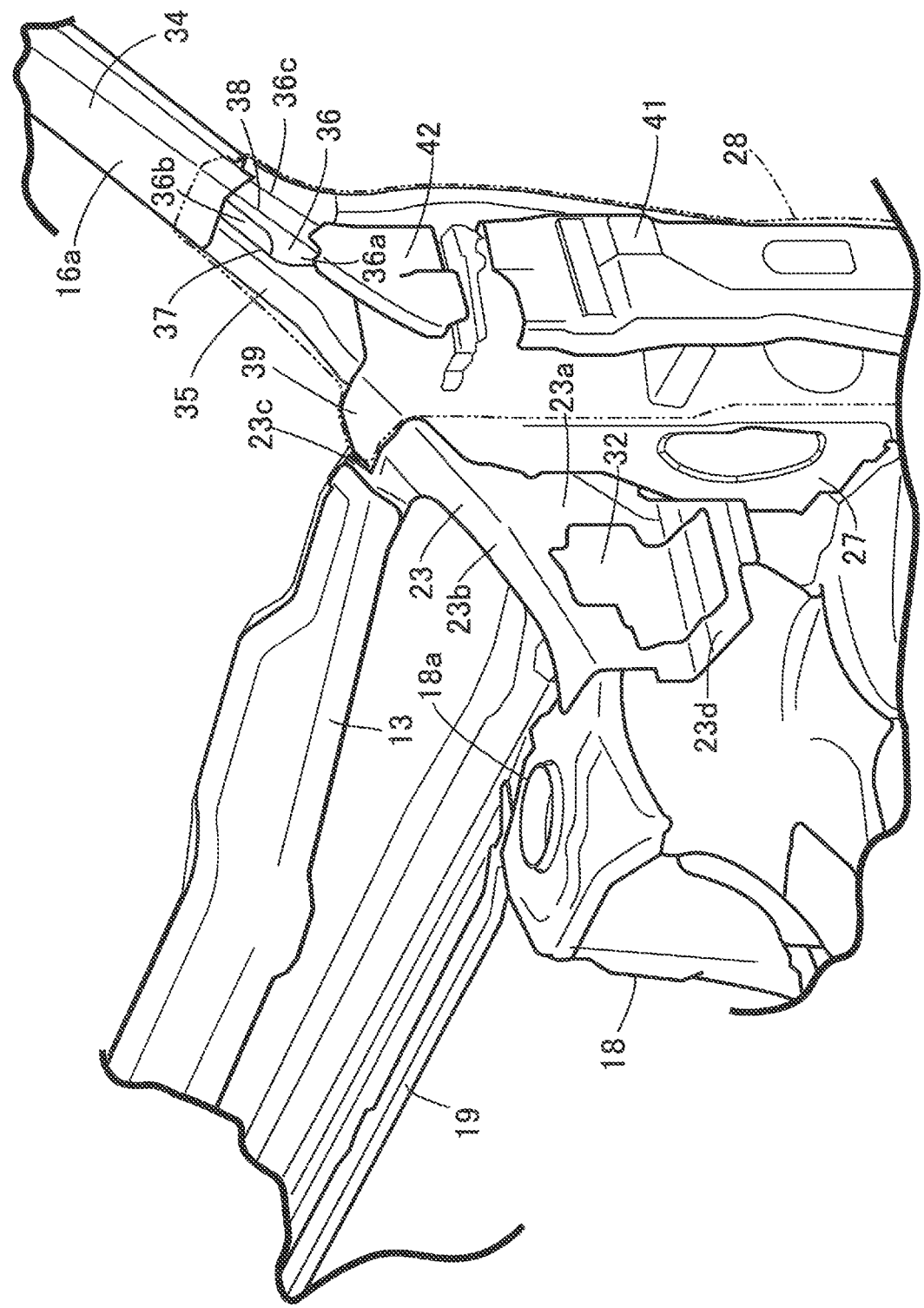
FIG. 6 is an enlarged perspective view schematically showing an inner structure of a front pillar outer panel.

As shown in FIG. 6, the front pillar upper 16*a* has a front pillar upper inner panel 35 which is rigidly joined to the upper end of the front pillar lower inner panel 27, extends rearward and upward to support the side edges of the windshield 12 and is covered from the outside by a front pillar upper outer panel 34; and a front pillar upper stiffener 36 which is joined to the outer surface of the front pillar upper inner panel 35 and reinforces the rigidity of the front pillar upper inner panel 35 in the front-rear direction rising rearward. The front pillar upper stiffener 36 has a joining plate 36*a* which is overlapped with the front pillar upper inner panel 35 and extends rearward and upward in the front-rear direction, an upper plate 36*b* which is bent from the upper end of the joining plate 36*a* to form with the joining plate 36*a* a ridge 37 that extends rearward and upward in the front-rear direction, and a lower plate 36*c* which is bent from the lower end of the joining plate 36*a* to form with the joining plate 36*a* a ridge 38 that extends rearward and upward in the front-rear direction. The rigidity of the front pillar upper inner panel 35 in the front-rear direction rising rearward may be increased by the action of the ridges 37 and 38 formed at the upper and lower ends of the joining plate 36a. In this way, the bending rigidity of the front pillar upper 16a may be increased.

A connecting piece 39 overlapped with the widening piece 23c of the dash upper side 23 is integrally connected to the upper end of the front pillar lower inner panel 27. The connecting piece 39 may be molded from, for example, a plate material continuous from the front pillar lower inner panel 27. The connecting piece 33 of the front pillar outer panel 28 is overlapped with the connecting piece 39 of the front pillar lower inner panel 27. In this way, the front pillar lower inner panel 27 and the front pillar outer panel 28 are sequentially stacked on the widening piece 23c of the dash upper side 23. The widening piece 23c, the connecting piece 33 and the connecting piece 39 are overlapped and joined to each other. For example, welding may be used for joining.

A first front pillar outer panel stiffener 41 which extends in the vertical direction while facing the front pillar lower inner panel 27 and a second front pillar outer panel stiffener 42 which faces the boundary area between the front pillar lower inner panel 27 and the front pillar upper inner panel 35 above the first front pillar outer panel stiffener 41 are rigidly fixed on the inner surface of the front pillar outer panel 28. For example, welding may be used for fixing.

Figure 7:
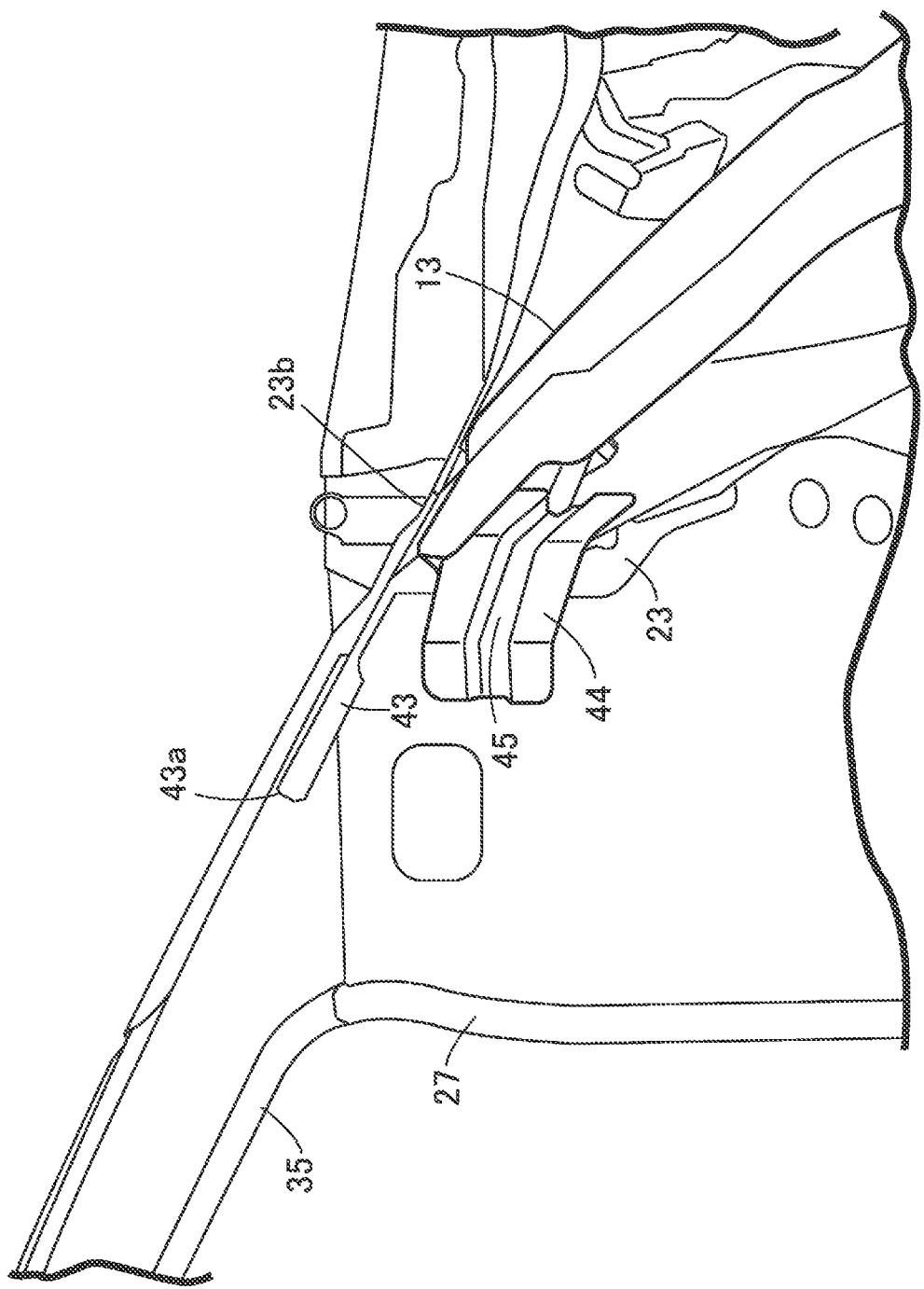
FIG. 7 is an enlarged perspective view schematically showing a joint between a front pillar lower inner panel and a windshield support member.

As shown in FIG. 7, the dash upper side 23 includes a rear extension part 43 which is continuous from the horizontal wall 23b and extends rearward and upward with respect to the widening piece 23c. The rear extension part 43 is formed of a plate material continuous from the horizontal wall 23b. The rear extension part 43 is rigidly joined to the inward surface of the front pillar upper inner panel 35. For example, welding may be used for joining. Here, the rear extension part 43 forms, for example, a ridge 43a which extends in the front-rear direction rising rearward. The bending rigidity of the front pillar upper inner panel 35 may be increased by joining the rear extension part 43 to the front pillar upper inner panel 35.

A reinforcing member 44 is fixed to the windshield support member 13. The reinforcing member 44 is connected to the inward surface of the front pillar lower inner panel 27. The reinforcing member 44 may be molded from, for example, a plate material of aluminum alloy or stainless steel. The reinforcing member 44 is formed with a bead (reinforcing structure) 45 which crosses the boundary between the windshield support member 13 and the front pillar lower inner panel 27. The reinforcing member 44 joins the windshield support member 13 to the front pillar lower inner panel 27.

Figure 8:
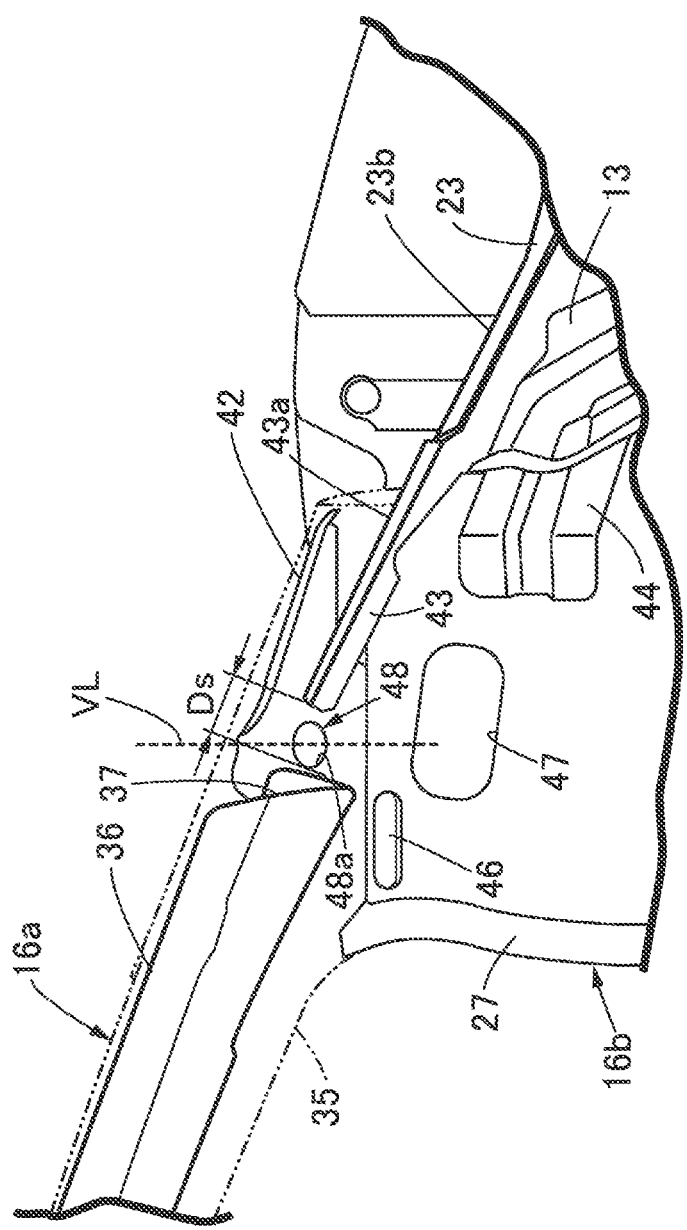
FIG. 8 is an enlarged perspective view schematically showing the relationship between a rear extension part of the dash upper side and a front pillar upper stiffener.

As shown in FIG. 8, a distance Ds is set between the rear extension part 43 of the dash upper side 23 and the front pillar upper stiffener 36 above the front pillar lower inner panel 27. At this time, the front pillar upper stiffener 36 has a bent shape having the ridge 37 on the extension line of the ridge 43a of the rear extension part 43. The front pillar upper stiffener 36 is fixed to the outward surface of the front pillar upper inner panel 35. The rear extension part 43 of the dash upper side 23 is fixed to the inward surface of the front pillar upper inner panel 35.

A reinforcing structure 46 is formed on the front pillar lower inner panel 27 from below the front end of the front pillar upper stiffener 36 toward the rear side. The reinforcing structure 46 may be formed by, for example, a bead which extends horizontally from below the front end of the front pillar upper stiffener 36 toward the rear side. The reinforcing structure 46 reinforces the rigidity of the front pillar lower inner panel 27 in the horizontal direction. In this way, the bending rigidity of the front pillar lower inner panel 27 may be increased. A fragile zone may be formed in the front pillar lower inner panel 27 in front of the reinforcing structure 46 and behind the reinforcing member 44. The fragile zone may be formed, for example, by an opening 47. Here, the opening 47 is located below the space which forms the distance Ds between the rear extension part 43 and the front pillar upper stiffener 36.

The second front pillar outer panel stiffener 42 is joined to the inner surface of the front pillar outer panel 28 at a position facing the extension line of the front pillar upper stiffener 36. The second front pillar outer panel stiffener 42 has a fragile zone 48 at a position facing a vertical line VL that passes through the space forming the distance Ds between the rear extension part 43 and the front pillar upper stiffener 36. Here, the fragile zone 48 is formed by a circular opening 48a.

At the time of a small overlap collision, the impact of the collision is absorbed based on the deformation of the upper member 15. Since the distance Ds is set between the rear extension part 43 of the dash upper side 23 and the front pillar upper stiffener 36, when the upper member 15 is crushed, the deformation (bending) of the front pillar upper 16a is facilitated at a cut of the rear extension part 43 and the front pillar upper stiffener 36 above the front pillar lower inner panel 27. In this way, the collision energy may be absorbed by sequentially deforming the upper member 15 and the front pillar 16. Even if the weight of the vehicle itself increases, the deformation of the side door may be prevented.

The vehicle body 11 according to the embodiment includes the reinforcing structure 46 which is formed on the front pillar lower inner panel 27 from below the front end of the front pillar upper stiffener 36 toward the rear side to reinforce the rigidity of the front pillar lower 16b in the horizontal direction. The front pillar lower 16b may be bent along a vertical line at the front end of the reinforcing structure. In this way, the bending deformation of the front pillar lower 16b may be controlled.

In the embodiment, the front pillar upper stiffener 36 has a bent shape having the ridge 37 on the extension line of the ridge 43a of the rear extension part 43. Since the ridge 37 of the front pillar upper stiffener 36 and the ridge 43a of the dash upper side 23 are disposed on a straight line, the load may be supported in the line direction. The deformation of the upper member 15 may be ensured prior to the deformation of the front pillar 16.

The front pillar upper stiffener 36 is fixed to the outward surface of the front pillar upper 16a, and the rear extension part 43 of the dash upper side 23 is fixed to the inward surface of the front pillar upper 16a. Since the reinforcing structures are switched inside and outside the front pillar upper 16a, the deformation of the front pillar upper 16a may be facilitated in the switching area.

The dash upper side 23 according to the embodiment has the vertical wall 23a which extends to the front side from the rear extension part 43 of the dash upper side 23, the horizontal wall 23b which is bent inward in the vehicle width direction from the upper end of the vertical wall 23a in front of the front pillar upper 16a to increase the rigidity of the vertical wall 23a in the front-rear direction of the vehicle body, and the widening piece 23c which expands further inward in the vehicle width direction from the horizontal wall 23b and is joined to the windshield support member 13. Since the rigidity of the dash upper side 23 in the front-rear direction of the vehicle body is reinforced based on the formation of the ridge in front of the front pillar upper 16a, the deformation (bending) of the front pillar upper 16a may be facilitated at a cut of the dash upper side 23 and the front pillar upper stiffener 36.

In the embodiment, the front pillar lower inner panel 27 and the front pillar outer panel 28 are stacked on the widening piece 23c. Since the rigidity of the widening piece 23c is further reinforced in front of the front pillar upper 16a, the deformation (bending) of the front pillar upper 16a may be further facilitated at the cut of the dash upper side 23 and the front pillar upper stiffener 36.

The front end of the dash upper side 23 is joined to the damper base 18a. The deformation of the upper member 15 may be facilitated in front of the damper housing 18.

The dash upper side 23 has the lower horizontal wall 23d which is bent outward in the vehicle width direction from the lower end of the vertical wall 23a to receive the upper member 15. Since the lower horizontal wall 23d increases the rigidity of the vertical wall 23a in the front-rear direction of the vehicle body based on the formation of the ridge, the deformation of the upper member 15 may be facilitated in front of the damper base 18a.

The second front pillar outer panel stiffener 42 according to the embodiment has the fragile zone 48 at the position facing the vertical line VL that passes through the space forming the distance between the rear extension part 43 and the front pillar upper stiffener 36. The rigidity of the front pillar outer panel is increased by the action of the second front pillar outer panel stiffener 42, but the bending of the front pillar around the vertical line may be facilitated by the action of the fragile zone 48.

The vehicle body 11 according to the embodiment includes the reinforcing member 44 which joins the windshield support member 13 to the front pillar lower inner panel 27. The rigidity of the widening piece 23c may be reinforced. As a result, the deformation of the upper member 15 may be facilitated in front of the widening piece 23c. The collision energy may be well absorbed by the upper member 15.

What is claimed is:

1. A vehicle body comprising:
   a front pillar upper which extends rearward and upward along a side edge of a windshield;
   a front pillar lower which is joined to a lower end of the front pillar upper to support a front end of a side door;
   a dash upper side which connects an upper member to the front pillar lower while being joined to the front pillar upper at a rear extension part; and
   a front pillar upper stiffener which reinforces the bending rigidity of the front pillar upper,
   wherein a distance is set between the rear extension part of the dash upper side and a front end of the front pillar upper stiffener above the front pillar lower.

2. The vehicle body according to claim 1, further comprising:
   a reinforcing structure which is formed on the front pillar lower from below the front end of the front pillar upper stiffener toward a rear side to reinforce the rigidity of the front pillar lower in a horizontal direction.

3. The vehicle body according to claim 1, wherein the front pillar upper stiffener has a bent shape having a ridge on an extension line of a ridge of the rear extension part.

4. The vehicle body according to claim 1, wherein the front pillar upper stiffener is fixed to an outward surface of the front pillar upper, and the rear extension part of the dash upper side is fixed to an inward surface of the front pillar upper.

5. The vehicle body according to claim 1, wherein the dash upper side comprises:
   a vertical wall which extends to a front side from the rear extension part;
   a horizontal wall which is bent inward in a vehicle width direction from an upper end of the vertical wall in front of the front pillar upper to increase the rigidity of the vertical wall in a front-rear direction of the vehicle body; and
   a widening piece which expands further inward in the vehicle width direction from the horizontal wall and is joined to a windshield support member that supports a lower edge of the windshield.

6. The vehicle body according to claim 5, wherein a front pillar lower inner panel and a front pillar outer panel which are components of the front pillar lower are stacked on the widening piece.

7. The vehicle body according to claim 5, wherein a front end of the dash upper side is joined to a damper base.

8. The vehicle body according to claim 7, wherein the dash upper side further comprises:
   a lower horizontal wall which is bent outward in the vehicle width direction from a lower end of the vertical wall to receive the upper member.

9. The vehicle body according to claim 1, further comprising:
   a front pillar outer panel which covers a front pillar lower inner panel and a front pillar upper inner panel from the outside; and
   a front pillar outer panel stiffener which is joined to an inner surface of the front pillar outer panel at a position facing an extension line of the front pillar upper stiffener and has a fragile zone at a position facing a vertical line that passes through a space forming the distance.

10. The vehicle body according to claim 5, further comprising:
    a reinforcing member which joins the windshield support member to a front pillar lower inner panel that is a component of the front pillar lower below the widening piece.

* * * * *